United States Patent Office 3,040,021
Patented June 19, 1962

3,040,021
DIAZO TRIAZINE DYESTUFFS
Raymond Gunst, Binningen, Switzerland, assignor to Ciba Corporation, a corporation of Delaware
No Drawing. Filed Sept. 2, 1958, Ser. No. 758,562
Claims priority, application Switzerland Sept. 17, 1957
11 Claims. (Cl. 260—153)

This invention provides disazo-dyestuffs of the general formula

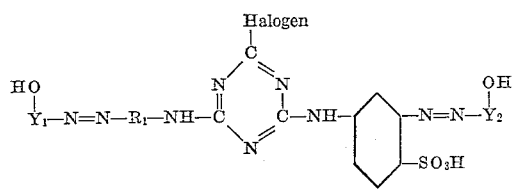

(1)

in which $R_1$ represents a benzene radical which contains a sulfonic acid group and to which the —NH— group is bound in para-position or advantageously in meta-position to the azo linkage, and

and

each represents the radical of a coupling component bound to the azo linkage in a position vicinal to the hydroxyl group and at least one of which radicals contains at least one acid group imparting solubility in water, for example, a sulfonic acid amide group or alkyl sulfone group or more especially a carboxylic acid or sulfonic acid group.

The invention also provides a process for the manufacture of the dyestuffs of the above formula, wherein a 2:4:6-trihalogen-1:3:5-triazine, especially cyanuric chloride, is condensed, on the one hand, with a monoazo-dyestuff of the formula (2)
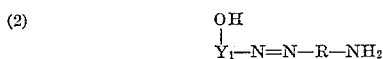

in which R represents a benzene radical which contains a sulfonic acid group and which is bound to the azo linkage in para-position or advantageously in meta-position to the —NH₂ group, and

has the meaning given with reference to Formula 1, and, on the other, with a monoazo-dyestuff of the formula (3)
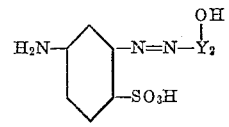

in which

has the meaning given with reference to Formula 1.

The monoazo-dyestuffs of the Formula 2, which are used as starting materials, can be prepared by coupling a compound capable of coupling in a position vicinal to a hydroxyl group (including an enolizable or enolized keto group) with a diazotized aminobenzene sulfonic acid which contains in para-position or advantageously in meta-position to the diazo group a free amino group or a substituent convertible into a free amino group by reduction or hydrolysis after the coupling operation.

The monoazo-dyestuffs of the Formula 3 can be prepared by reducing a dyestuff of the formula

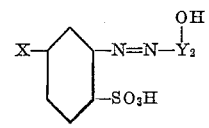

(4)

in which X represents a nitro-group, and

represents the radical of a coupling component, or by hydrolysing a corresponding dyestuff in which X represents an acylamino group. As coupling components for preparing the dyestuffs of the Formulae 2 and 3 or 4, there may be used, for example, phenols, naphthols, naphthol sulfonic acids, barbituric acid, dioxyquinoline, β-keto carboxylic acid arylide and especially 5-pyrazolones capable of coupling in the 4-position, and aminonaphthol sulfonic acids, especially acylaminonaphthol sulfonic acids, capable of coupling in a position vicinal to the hydroxyl group.

The condensations of the dyestuffs of the Formulae 2 and 3 with cyanuric chloride may be carried out in either order of succession, advantageously in the presence of an acid-binding agent, such as sodium acetate, sodium hydroxide or sodium carbonate, preferably in an aqueous medium, the condensations being carried out in such manner that a monochlorotriazine dyestuff containing two azo linkages is obtained.

Each of the condensations is advantageously carried out at a pH value of 5-7. Depending on the nature of the starting materials used it may be of advantage to increase the pH value somewhat from one stage to the next. It is generally desirable, however, to maintain substantially the same pH value in each stage.

The invention also provides a process for the manufacture of dyestuffs of the above Formula 1 and especially those which are symmetrical, wherein a tetrazo-compound of a diamine of the formula

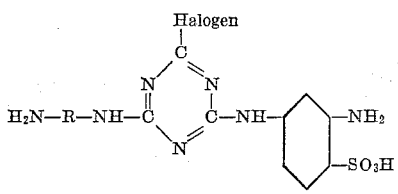

(5)

in which R has the meaning given with reference to Formula 2, is coupled on both sides with a coupling component capable of coupling in a position vicinal to a hydroxyl group and at least one of which coupling components contains an acid group imparting solubility in water.

The invention further provides a process for the manufacture of dyestuffs of the Formula 1, which is especially advantageous for making asymmetrical dyestuffs of that formula or when those dyestuffs of Formulae 2 and 3 are used which do not condense easily or are not easily obtainable, or when the dyestuff of the Formula 2 or 3 contains an acylatable amino group in the radical OH
|

or

OH
|

In this process a diazo-compound of an amine of the formula (6)

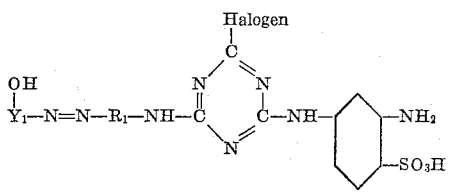

or (7)

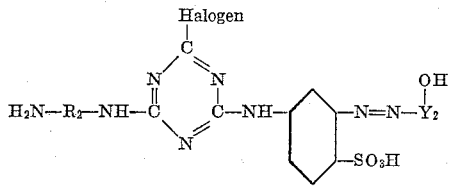

in which

OH, OH
|    |

and $R_1$ have the meanings given with reference to Formula 1, and $R_2$ represents a benzene radical which contains a sulfonic acid group and to which the —NH— group is bound in para-position or advantageously in meta-position to the free amino group, is coupled with a coupling component capable of coupling in a position vicinal to a hydroxyl group and the starting materials are so selected that the resulting disazo-dyestuff contains at least one radical of a coupling component containing an acid group imparting solubility in water. Accordingly, when a diazo compound of an amine of the Formula 6 or 7 is used which contains no acid group imparting solubility in water in the radical OH
|

or

OH
|

a coupling component containing an acid group imparting solubility in water must be used.

As coupling components capable of coupling in a position vicinal to a hydroxyl group there may be mentioned, for example, β-keto-carboxylic acid esters or amides or groups capable of coupling in the α-position, for example, acetoacetic acid arylides, pyrazolones, especially 5-pyrazolones capable of coupling in the 4-position, such as 3-methyl-5-pyrazolone, 1-phenyl-3-methyl-5-pyrazolone, 1-phenyl-3-methyl-5-pyrazolone -2'- or -3'- or -4'-sulfonic acid, 1-phenyl-5-pyrazolone-3-carboxylic acid, 5-pyrazolone-3-carboxylic acid amide, barbituric acids, hydroxyquinolines such as 2:4-dihydroxyquinoline and phenols such as para-cresol, 4-acetylamino-1-hydroxybenzene, 4-methyl-2-acetylamino-1-hydroxybenzene; naphthols, such as β-naphthol, 2-hydroxynaphthalene sulfonic acid amide, and above all hydroxynaphthalene sulfonic acids, especially amino-hydroxynaphthalene sulfonic acids and N-alkyl- or N-aryl-derivatives thereof, such as 1-hydroxynaphthalene-3-, -4-, -5- or 8-sulfonic acid, 2-hydroxynaphthalene-4-, -5-, -6-, -7- or -8-sulfonic acid, 1:8-dihydroxynaphthalene - 3:6 - disulfonic acid, 2-hydroxynaphthalene-3:6- or 6:8-disulfonic acid, 1-hydroxynaphthalene-3:6- or -3:8-disulfonic acid, 2 - amino - 8 - hydroxynaphthalene-6-sulfonic acid, 2-amino - 6 - hydroxynaphthalene-8-sulfonic acid, 2-amino-5-hydroxynaphthalene-7-sulfonic acid, 2 - methylamino - 5 - hydroxynaphthalene-7-sulfonic acid, 2-amino-5-hydroxynaphthalene-3:7-disulfonic acid, 1-amino-8-hydroxynaphthalene-2:4-, -3:6- or -4:6-disulfonic acid and N-acylderivatives of aminonaphthol sulfonic acids which contain as the acyl group, for example, an acetyl, propionyl, butyryl, chloracetyl, benzoyl, ortho-, meta-or para-chlorobenzoyl, tertiary butyl benzoyl, 3'- or 4'-aminobenzoyl, methane- or ethane-sulfonyl, para-toluene sulfonyl or chlorobenzene sulfonyl group or a carbomethoxy- or carbethoxy-group or an acyl group derived from a cyanuric acid, for example, a group of the formula

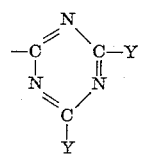

in which each Y represents a halogen atom, hydroxyl or amino group and especially a substituted amino-group.

The diazo-compounds to be coupled with the coupling components can be made by methods in themselves known by diazotizing an amine of the Formula 6 or 7. Such amines can be prepared by condensing, for example, cyanuric chloride, on the one hand, with a dyestuff of the Formula 2 and, on the other, with 2:4-diaminobenzene-1-sulfonic acid, or, on the one hand, with a dyestuff of the Formula 3, and on the other, with a para- or advantageously a meta-diaminobenzene sulfonic acid.

The new dyestuffs of this invention are suitable for dyeing or printing a very wide variety of materials, such as wool, silk, leather or superpolyamide fibers, and especially fibers of cellulosic materials, such as linen, regenerated cellulose and especially cotton. They are especially well suited for dyeing by the so-called pad dyeing process, in which the goods are impregnated with an aqueous dyestuff solution, which may contain a salt, and the dyestuff is fixed after treatment with an alkali or in the presence of an alkali at a raised temperature. This process and direct dyeing methods, which can also be used for many of the dyestuffs of this invention, lead to dyeings or prints which are usually distinguished by the purity of their tints, their good fastness to light and above all their excellent fastness to washing.

When the dyestuffs contain groups capable of forming metal complexes, for example, ortho-hydroxy-carboxy-groupings, such as are present, for example, in the radical of salicyclic acid, the dyeings produced therewith may be treated with an agent yielding metal, for example, an agent yielding chromium and advantageously an agent yielding nickel or copper. The treatment with the agent yielding metal may be carried out by the usual known methods. Very valuable dyeings can be obtained by using the process in which a dyeing produced with the metal-free dyestuff is after-treated with an aqueous solution which contains a water-soluble copper compound, especially a complex copper compound, and a basic formaldehyde condensation product of a compound containing at least once the atomic grouping

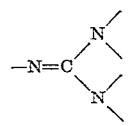

or a compound, such as cyanamide, which is readily convertible into a compound containing such an atomic grouping.

The following examples illustrate the invention, the parts and percentages being by weight:

*Example 1*

18.6 parts of cyanuric chloride are dissolved in 50 parts of acetone with the aid of heat, and the solution is poured into 200 parts of water and ice, while stirring well. To the fine suspension so obtained there is added a solution, adjusted to a pH value of 7 of 18.8 parts of 1:3-diaminobenzene-4-sulfonic acid in 300 parts of water. The hydrochloric acid that forms during the condensation is neutralized with 4 parts of sodium hydroxide in the form of an aqueous solution in such manner that the pH value remains constant at 6.5. The temperature should not exceed 5° C.

When the condensation is finished, the pH value of the mixture is adjusted to 7.5 by the addition of a dilute solution of sodium hydroxide, 6.9 parts of sodium nitrite are added, and the whole is poured into 200 parts of ice and 25 parts of hydrochloric acid of 30% strength. After 30 minutes the diazotization is complete. The diazo-compound is coupled at 0–10° C. with 12.8 parts of barbituric acid, which has been dissolved in 300 parts of water with the addition of 4 parts of sodium hydroxide, and 20 parts of sodium carbonate are also added.

When the coupling is finished, the mixture is adjusted to a pH value of 6.5, and a neutral solution of 18.8 parts of 1:3-diaminobenzene-4-sulfonic acid in 200 parts of water is added. The whole is heated to 40° C. and the pH value is maintained as nearly constant as possible at 6.5 by the dropwise addition of an aqueous solution of 4 parts of sodium hydroxide. After 4 hours the whole is cooled to 20° C. by the addition of ice, 6.9 parts of sodium nitrite are added, and the whole is poured into 200 parts of water and 70 parts of α-naphthalene sulfonic acid of 30% strength.

After 4 hours, the diazo-compound is coupled with 36.1 parts of 1-acetylamino-8-hydroxynaphthalene-3:6-disulfonic acid in 200 parts of water and 20 parts of sodium carbonate. The coupling temperature is 10° C. After 24 hours the dyestuff is separated and dried. It dyes cellulose fibers by the pad dyeing process fast scarlet tints.

*Example 2*

The primary condensation product prepared as described in the first paragraph of Example 1 from 1/10 mol of cyanuric chloride and 1/10 mol of 1:3-diaminobenzene-4-sulfonic acid is diazotized as described in the second paragraph of Example 1. The diazo-compound is coupled at 0–10° C. with 36.1 parts of 1-acetylamino-8-hydroxynaphthalene-3:6-disulfonic acid in 200 parts of water and 20 parts of sodium carbonate at 10° C.

When the coupling is complete the mixture is adjusted to a pH value of 6.5, and a neutral solution of 18.8 parts of 1:3-diaminobenzene-4-sulfonic acid in 200 parts of water is added. The whole is heated to 40° C. and maintained as nearly as possobile at a pH value of 6.5 by the dropwise addition of an aqueous solution of 4 parts of sodium hydroxide. After 4 hours the whole is cooled to 20° C. by the addition of ice, 6.9 parts of sodium nitrite are added, and the whole is poured into 200 parts of water and 70 parts of α-naphthalene sulfonic acid of 30% strength.

After 4 hours the diazo compound is coupled with 32.3 parts of 2':5'-dichloro - 4' - sulfo-1-phenyl-3-methyl-5-pyrazolone in 300 parts of water and 20 parts of sodium carbonate. The coupling temperature is 10° C. After stirring the mixture for 24 hours the dyestuff is separated and dried. It dyes cellulose fibers by the pad dyeing process fast scarlet tints.

A dyestuff having similar properties is obtained by using the 3-methyl-5-pyrazolone from 2-aminonaphthalene-4:8-disulfonic acid, instead of 2':5'-dichloro-4'-sulfo-1-phenyl-3-methyl-5-pyrazolone.

Dyestuffs having similar properties are obtained by using cyanuric bromide instead of cyanuric chloride.

*Example 3*

1/10 mol of the diazo-compound of the amine of the formula

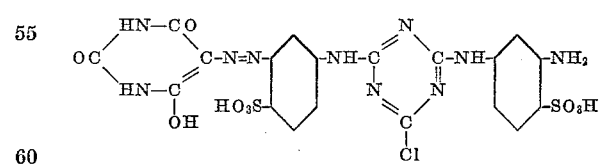

obtained as described in the first three paragraphs of Example 1, is coupled with 32.3 parts of 1-(2':5'-dichlorophenyl)-3-methyl - 5 - pyrazolone-4'-sulfonic acid in 300 parts of water and 20 parts of sodium carbonate at 10° C. After 24 hours, the dyestuff is separated and dried. It dyes cellulose fibers by the pad-dyeing process pure greenish yellow tints of excellent fastness to light.

By using, instead of the dyestuff of the above formula, those given in column I of the following table and, instead of 1-(2':5'-dichlorophenyl) - 3 - methyl - 5 - pyrazolone-4'-sulfonic acid, the coupling components given in column II there are obtained similar dyestuffs which produce on cotton by the so-called pad-dyeing process fast dyeings having the tints given in column III:

to a pH value of 6.5, and a neutral solution of 18.8 parts of 1:3-diaminobenzene-4-sulfonic acid in 200 parts of

| | I | II | III |
|---|---|---|---|
| 1 | H₃C—C—C—N=N—(HO₃S-phenyl-Cl)—NH—C(triazine)—NH—(phenyl-SO₃H, NH₂) (with NH, OH pyrazolone) | 1-hydroxynaphthalene-4-sulfonic acid. | red. |
| 2 | H₃C—C—C—N=N—(HO₃S-phenyl-Cl)—NH—C(triazine)—NH—(phenyl-NH₂, SO₃H) (with NH, OH pyrazolone) | 2-acetylamino-8-hydroxynaphthalene-6-sulfonic acid. | scarlet. |
| 3 | H₃C—CH₂—CH₂—CO—HN-(naphthyl with OH, HO₃S, SO₃H)—N=N—(phenyl-SO₃H-Cl)—NH—C(triazine)—NH—(phenyl-NH₂, SO₃H) | 1-n-butyrylamino-8-hydroxynaphthalene-3:6-disulfonic acid. | bluish red. |
| 4 | H₃C—CH₂—CH₂—CO—HN-(naphthyl with OH, HO₃S, SO₃H)—N=N—(phenyl-SO₃H-Cl)—NH—C(triazine)—NH—(phenyl-NH₂, SO₃H) | 2-methylamino-5-hydroxynaphthalene-7-sulfonic acid. | red. |

The third dyestuff in the above table can be made by coupling a tetrazo-compound of the diamine of the formula

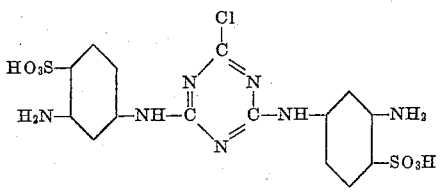

on both sides with 1-n-butyrylamino-8-hydroxynaphthalene-3:6-disulfonic acid.

*Example 4*

The intermediate product obtained as described in the first paragraph of Example 1 from 1/10 mol of cyanuric chloride and 1/10 mol of 1:3-diaminobenzene-4-sulfonic acid is diazotized in the manner described in the second paragraph of that example. The diazo-compound is coupled with 38.9 parts of 1-n-butyrylamino-8-hydroxynaphthalene-3:6-disulfonic acid in 200 parts of water and 20 parts of sodium carbonate at 10° C.

When the coupling is finished the mixture is adjusted to a pH value of 6.5, and a neutral solution of 18.8 parts of 1:3-diaminobenzene-4-sulfonic acid in 200 parts of water is added. The whole is heated to 40° C., and the pH value is maintained as nearly constant as possible at 6.5 by the dropwise addition of an aqueous solution of 4 parts of sodium hydroxide. After 4 hours the mixture is cooled to 20° C. by the addition of ice, 6.9 parts of sodium nitrite are added, and the whole is poured into 200 parts of water and 70 parts of α-naphthalene sulfonic acid of 30% strength.

After 4 hours, the diazo compound so obtained is coupled with 38.4 parts of 5':7'-disulfo-1-naphthyl-(2')-3-methyl-5-pyrazolone in 200 parts of water and 20 parts of sodium carbonate. The coupling temperature is 10° C. After stirring the mixture for 24 hours the dyestuff is precipitated, isolated by filtration and dried. It dyes cellulose fibers by the pad dyeing process fast scarlet tints.

*Example 5*

18.6 parts of cyanuric chloride are dissolved in 50 parts of acetone with the aid of heat, and the solution is poured, while stirring well, into 200 parts of water and ice. To the resulting fine suspension there is added a solution, adjusted to a pH value of 7, of 18.8 parts of 1:3-diamino-4-sulfonic acid in 300 parts of water. The hydrochloric acid formed during the condensation is neutralized with 4 parts of sodium hydroxide in aqueous solution in such manner that the pH value remains constant at 6.5. The temperature should not exceed 5° C.

When the condensation is finished, the pH value of the mixture is adjusted to 7.5 by the addition of a dilute solution of sodium hydroxide, 6.9 parts of sodium nitrite are added, and the whole is poured into 200 parts of ice and 25 parts of hydrochloric acid of 30% strength. After 30 minutes the diazotization is complete. The diazo-compound is coupled at 0–10° C. with 28.2 parts of 2-ureido-5-hydroxynaphthalene-7-sulfonic acid dissolved in 400 parts of water with the addition of 30 parts of sodium carbonate.

A yellow amino-monoazo-dyestuff is prepared in known manner by diazotizing 23.0 parts of 1-amino-3-acetyl-aminobenzene-6-sulfonic acid, coupling the diazo compound with 32.3 parts of 2':5'-dichloro-4'-sulfo-1-phenyl-3-methyl-5-pyrazolone, and then hydrolyzing the acetylamino group in a sulfuric acid solution.

52.2 parts of the amino-monoazo-dyestuff so obtained are dissolved as the sodium salt in 300 parts of water, and the solution is added to the dyestuff resulting from the coupling operation described in the second paragraph of this example. The mixture is adjusted to a pH value of 6.5. The whole is heated to 40° C., maintained for 4–5 hours at that temperature while stirring, and the pH value is maintained as nearly constant as possible at 6.5 by the dropwise addition of an aqueous solution of 4 parts of sodium hydroxide. When the condensation is finished, the pH value is increased to about 8, and the dyestuff formed is precipitated by the addition of sodium chloride, filtered off and dried. It dyes cellulose fibers by the pad-dyeing process fast orange yellow tints.

A similar dyestuff, which yields somewhat redder orange tints, is obtained by using in this example, on the one hand, 5-pyrazolone-3-carboxylic acid instead of 2':5'-dichloro - 4'-sulfo-1-phenyl-3-methyl-5-pyrazolone and, on the other, 2-acetylamino-5-hydroxynaphthalene-7-sulfonic acid or 2-amino-5-hydroxynaphthalene-3:7-disulfonic acid instead of 2-ureido-5-hydroxynaphthalene-7-sulfonic acid.

*Example 6*

18.8 parts of 1:4-diaminobenzene-3-sulfonic acid are diazotized in known manner with one equivalent of nitrous acid in such manner that only the amino group in the 1-position is diazotized. The resulting diazo-compound is coupled with 42.3 parts of 1-benzoylamino-8-hydroxynaphthalene-3:6-disulfonic acid in an aqueous solution rendered alkaline with sodium carbonate.

62.2 parts of the violet aminomonoazo-dyestuff so obtained are dissolved as the sodium salt in 400 parts of water, and the solution is added to a fine aqueous suspension of 18.6 parts of cyanuric chloride. The temperature is maintained at 0–5° C., while stirring, and the hydrochloric acid formed during the condensation is neutralized by the dropwise addition of a dilute aqueous solution of 4 parts of sodium hydroxide in such manner that the pH value is maintained between 6.0 and 6.5. The condensation is complete in 1–2 hours.

For the second condensation there are used exactly as described in Example 5, 52.2 parts of the yellow amino-monoazo-dyestuff obtained by coupling diazotized 1-amino-3-acetylamino-benzene-6-sulfonic acid in an alkaline medium with 2':5'-dichloro-4'-sulfo-1-phenyl-3-methyl-5-pyrazolone followed by hydrolysis in a sulfuric acid medium.

The secondary condensation product so formed is precipitated by salting it out from a weakly alkaline solution, filtered off and dried. On cellulose fibers it yields by the pad-dyeing process dyeings which are fast to washing.

*Example 7*

18.6 parts of cyanuric chloride are dissolved with the aid of heat in 50 parts of acetone and the solution is poured, while stirring well, into 200 parts of water and ice. To the fine suspension there is added a solution, adjusted to a pH value of 7 of 18.8 parts of 1:3-diaminobenzene-4-sulfonic acid in 300 parts of water. The hydrochloric acid formed during the condensation is neutralized with 4 parts of sodium hydroxide in aqueous solution in such manner that the pH value is maintained constant at 6.5. The temperature should not exceed 5° C.

When the first condensation is complete, a further 18.8 parts of 1:3-diaminobenzene-4-sulfonic acid in 300 parts of water is added, the whole is heated to 40° C., and care is taken by the slow dropwise addition of an aqueous solution of 4 parts of sodium hydroxide that the pH value remains between 6.0 and 6.5. After stirring the mixture for 2 hours at 40° C. the second condensation is complete.

By the addition of a small amount of ice the mixture is cooled to 15–20° C., and tetrazotization is carried out with the addition of 50 parts of hydrochloric acid of 30% strength and a dilute aqueous solution of 14 parts of sodium nitrite. After stirring the mixture for one hour the formation of the tetrazo-compound is complete.

For the purpose of coupling, 65 parts of 2':5'-dichloro-4'-sulfo-1-phenyl-3-methyl-5-pyrazolone are dissolved in 400 parts of water with the addition of 50 parts of sodium carbonate. The solution is cooled to 10° C. and the tetrazocompound is slowly run in.

The symmetrical disazo-dyestuff so obtained is precipitated by salting out, filtered off and dried. It dyes cellulose fibers by the pad-dyeing process very fast pure greenish yellow tints.

The symmetrical dyestuff No. 3 in the table given in Example 3, which contains 2 mols of 1-butyrylamino-8-hydroxynaphthalene-3:6-disulfonic acid as coupling component, can also be made by the process described in this example.

*Example 8*

18.6 parts of finely dispersed cyanuric chloride are stirred with ice, and a neutral solution of 18.8 parts of 1:3-diaminobenzene-4-sulfonic acid is added at a temperature not exceeding 0° C. By the dropwise addition of alkali the pH value is maintained at about 5 to 6. As soon as the condensation is finished, diazotization is carried out by the addition of 6.9 parts of sodium nitrite and 25 parts of hydrochloric acid of 30% strength at 0° C. The diazo-compound is coupled at 0° C. with 42.3 parts of 1-benzoylamino-8-hydroxynaphthalene - 3:6-disulfonic acid, dissolved in 400 parts of water with 30 parts of sodium carbonate. After 2 hours the pH value is adjusted to 5.5 with hydrochloric acid, and there is added a solution, adjusted to a pH value of 7.5, of 32.1 parts of 4-amino-2'-hydroxy-3':5'-dimethyl-1:1'-azobenzene-2-sulfonic acid in 400 parts of water. The temperature is brought to 40° C., and the condensation is advantageously carried out at a pH value of 6 by the addition of an alkali. When the condensation is finished, the mixture is adjusted to a pH value of 8.5, and the dyestuff is precipitated by the addition of sodium chloride and dried. The new dyestuff dyes cellulose fibers scarlet tints which are fast to light.

*Example 9*

1 part of the dyestuff obtained as described in Example 1 is dissolved in 100 parts of water.

A cotton fabric is impregnated with the resulting solution at 80° C. on a foulard, and the fabric is squeezed until it retains 75% of its weight of dyestuff solution.

The impregnated fabric is dried, then impregnated at room temperature with a solution containing per liter, 10 grams of sodium hydroxide and 300 grams of sodium chloride, the fabric is then squeezed to a weight increase of 75% and steamed for 60 seconds at 100–101° C. It is then rinsed, treated in a sodium bicarbonate solution of 0.5% strength, rinsed, soaped at the boil for ¼ hour in a solution of 0.3% strength of a nonionic detergent, rinsed and dried.

There is obtained a scarlet dyeing which is fixed fast to boiling. By using, instead of a cotton fabric, a fabric of staple fibers of renegerated cellulose a similar result is obtained.

By carrying out the impregnation with the dyestuff solution at 30° C., instead of 80° C. as described above, a similarly good result is obtained.

What is claimed is:

1. A water-soluble disazo dyestuff which in its free acid state corresponds to the formula

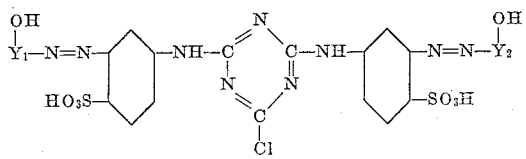

wherein $Y_1$—OH and $Y_2$—OH each represents a member selected from the group consisting of the radicals of barbituric acid, 3-methyl-5-pyrazolone bound to the adjacent azo linkage in 4-position and acyl-amino-1-hydroxynaphthalene-3-sulfonic acid which is bound to the adjacent azo linkage in 2-position and of which the acyl group is that of a lower carboxylic acid bound by its —CO—group; at least one of the radicals $Y_1$—OH and $Y_2$—OH containing a sulfonic acid group.

2. A water-soluble disazo dyestuff which in its free acid state corresponds to the formula

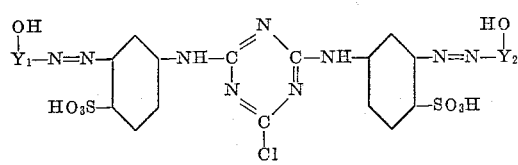

wherein $Y_1$—OH and $Y_2$—OH each represents the radical of an acylamino-1-hydroxynaphthalene-$\beta$-sulfonic acid bound to the azo linkage in 2-position, and of which the acyl group is that of a lower carboxylic acid bound by its —CO—group.

3. A water-soluble disazo dyestuff which in its free acid state corresponds to the formula

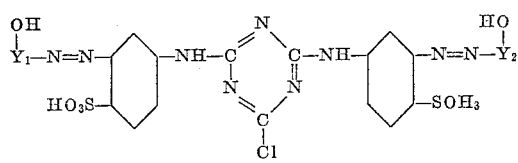

wherein $Y_1$—OH represents the radical of a 3-methyl-5-pyrazolone bound to the adjacent azo-linkage in 4-position and $Y_2$—OH represents the radical of an acyl-amino-1-hydroxynaphthalene-3-sulfonic acid bound to the azo-linkage in 2-position and of which the acyl group is that of a lower carboxylic acid bound by its —CO—group.

4. A water-soluble disazo dyestuff which in its free acid state corresponds to the formula

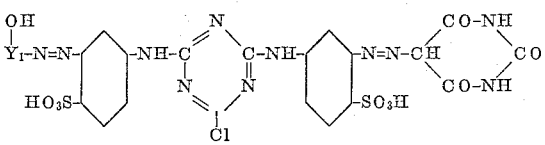

wherein $Y_1$ represents a 1-sulfonaphthyl-3-methyl-5-pyrazolone bound to the azo linkage in 4-position.

5. A water-soluble disazo dyestuff which in its free acid state corresponds to the formula

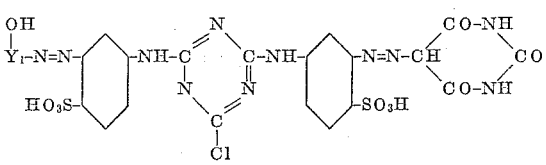

wherein $Y_1$—OH represents the radical of an acylamino-1-hydroxynaphthalene-3-sulfonic acid bound to the azo linkage in 2-position and of which the acyl group is that of a lower carboxylic acid bound by its —CO—group.

6. A water-soluble disazo dyestuff which in its free acid state corresponds to the formula

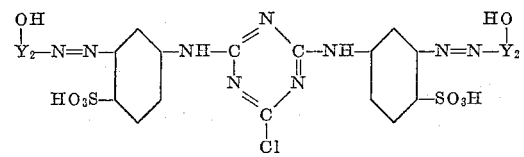

wherein $Y_2$—OH represents the radical of a 3-methyl-5-pyrazolone bound to the azo linkage in 4-position and $Y_1$—OH represents the radical of an acylamino-1-hydroxynaphthalene-3-sulfonic linkage in 2-position, and of which the acyl group is that of a lower carboxylic acid bound by its —CO—group.

7. The water-soluble disazo dyestuff which in its free acid state corresponds to the formula

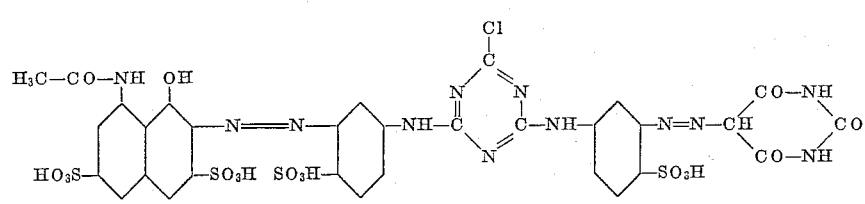

8. The water-soluble disazo dyestuff which in its free acid state corresponds to the formula

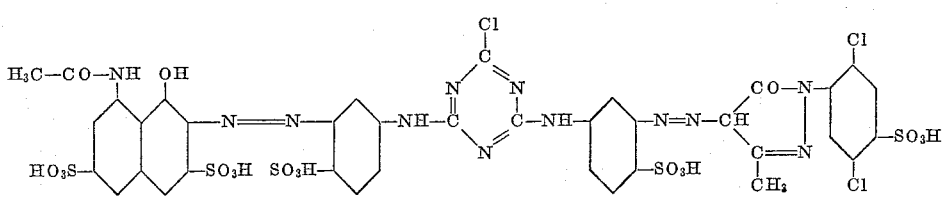

9. The water-soluble disazo dyestuff which in its free acid state corresponds to the formula

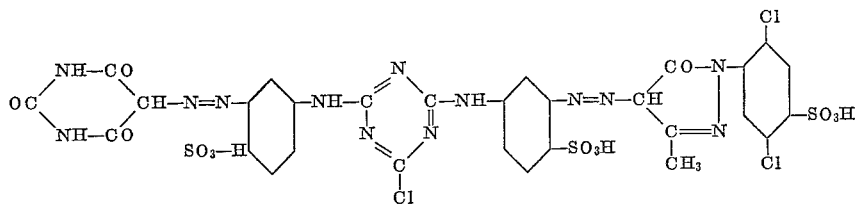

10. The water-soluble disazo dyestuff which in its free acid state corresponds to the formula

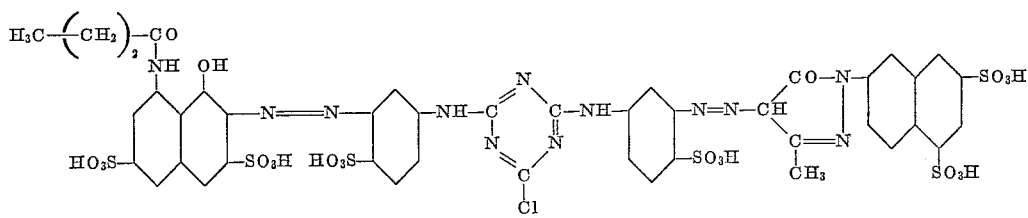

11. The water-soluble disazo dyestuff which in its free acid state corresponds to the formula

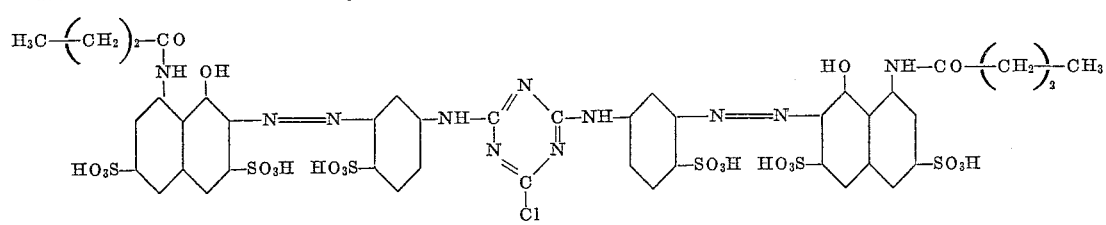

References Cited in the file of this patent
UNITED STATES PATENTS

| | | |
|---|---|---|
| 1,667,312 | Fritzsche et al. | Apr. 24, 1928 |
| 2,795,576 | Fasciati | June 11, 1957 |
| 2,910,464 | Fasciati et al. | Oct. 27, 1959 |
| 2,945,021 | Fasciati et al. | July 12, 1960 |

UNITED STATES PATENT OFFICE
CERTIFICATE OF CORRECTION

Patent No. 3,040,021            June 19, 1962

Raymond Gunst

It is hereby certified that error appears in the above numbered patent requiring correction and that the said Letters Patent should read as corrected below.

Column 6, line 28, for "possobile" read -- possible --; column 12, lines 8 to 13, in the formula of claim 4, the second ring member should read as shown below instead of as in the patent:

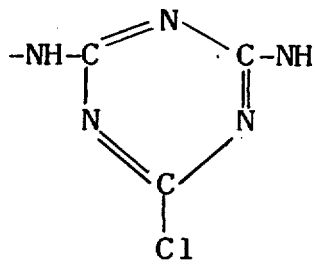

columns 13 and 14, in the formula of claim 9, at the lower end of the second ring member, for "$SO_3$-H" read --'$HO_3S$- --.

Signed and sealed this 27th day of November 1962.

(SEAL)
Attest:    ESTON G. JOHNSON

Attesting Officer

DAVID L. LADD
Commissioner of Patents